United States Patent [19]
Rees

[11] 3,726,625
[45] Apr. 10, 1973

[54] EJECTOR MECHANISM FOR MOLDED ARTICLES

[75] Inventor: Herbert Rees, Toronto, Ontario, Canada

[73] Assignee: Husky Manufacturing & Tool Works Limited, Bolton, Canada

[22] Filed: Feb. 16, 1971

[21] Appl. No.: 115,207

[52] U.S. Cl. ....................425/247, 425/444, 249/68
[51] Int. Cl. ...................................................B29f 1/14
[58] Field of Search.......................249/63, 66, 67, 68; 18/30 CT, 2 RC, 2 RP; 425/247, 444

[56] References Cited

UNITED STATES PATENTS

| | | | |
|---|---|---|---|
| 2,395,100 | 2/1946 | Caron | 18/30 LT |
| 2,792,592 | 5/1957 | McGee | 18/30 LT X |
| 2,837,765 | 6/1958 | Havey | 18/2 RP X |
| 3,161,918 | 12/1964 | Zearbaugh | 18/2 RP X |
| 3,418,684 | 12/1968 | Collins | 18/2 RP |
| 3,614,810 | 10/1971 | Schmier | 249/68 X |
| 2,711,567 | 6/1955 | Knapp | 249/68 |
| 3,448,488 | 6/1969 | Kiraly | 249/68 X |
| 2,946,102 | 7/1960 | Mills | 18/2 RP X |
| 3,362,046 | 1/1968 | Blumer | 18/2 RP X |
| 3,498,581 | 3/1970 | Judson | 249/67 |

FOREIGN PATENTS OR APPLICATIONS

| | | | |
|---|---|---|---|
| 201,286 | 12/1958 | Austria | 249/68 |

Primary Examiner—J. Howard Flint, Jr.
Attorney—Karl F. Ross

[57] ABSTRACT

On the opening stroke of a movable platen of an injection-molding machine, a rod rearwardly projecting from that platen strikes a stop and displaces an articulated linkage, hinged to the platen, which transmits the relative motion of rod and platen at a reduced rate to a set of ejector pins supported on that linkage.

8 Claims, 3 Drawing Figures

3,726,625

INVENTOR,
HERBERT REES
BY Karl J. Ross
ATTORNEY

INVENTOR,
HERBERT REES
BY Karl G. Ross
ATTORNEY

EJECTOR MECHANISM FOR MOLDED ARTICLES

My present invention relates to a mechanism for operating one or more ejector pins or equivalent thrust members to dislodge molded articles from their seats in a movable portion of a split mold.

In conventional injection-molding machines, a platen carrying the movable mold portion is reciprocable (generally on a set of tie rods) between a forward or closed-mold and a retracted or open-mold position, this reciprocation occurring in timed relationship with the movement of an injection piston introducing the hardenable plastic mass into the cavity or cavities of the closed mold. Each cavity is provided with an ejector, such as a pin slidable in the direction of reciprocation, which projects rearwardly from the movable platen and strikes an abutment as the platen retreats, thereby advancing with reference to the platen against the force of a biasing spring to enter the mold cavity and to eject the article seated therein.

With high-speed molding machines the impact between the ejector and a fixed stop on the machine bed tends to become objectionably violent and entails the danger of damage to the molded parts.

Thus, the object of my present invention is to provide means for softening this impact without sacrificing the positive action of conventional ejection mechanisms and with preservation of their adjustability to accommodate different molds and stroke lengths.

This object is realized, in accordance with my present invention, by the provision of an articulated linkage on the movable platen, the elements of this linkage forming a pair of positively interconnected junctions which move at different rates relative to the platen whereby a pusher member coupled with the faster-moving junction, upon engaging a fixed stop on the machine bed, causes a thrust member coupled to the slower-moving junction to advance at reduced speed with consequent lessened impact upon the molded article to be discharged.

In a preferred embodiment, the articulated linkage is of the knee-action type and comprises a pair of symmetrically disposed toggle joints each having an engaged end pivoted to the movable platen and a free end fulcrumed on a cross-link which may be a bar, a frame or a plate and which carries at least one ejector pin for each mold cavity. By virtue of the symmetrical arrangement of the two toggle joints, this cross-link stays parallel to the movable platen throughout its displacement relative thereto so that the ejector pin or pins may be rigidly connected therewith.

According to another advantageous feature of my invention, the end of the pusher member proximal to the platen is connected with the knee points of the two symmetrical toggle joints via a further toggle joint, the linkage thus constituted converting a linear motion of the pusher relative to the platen into a harmonic motion progressively accelerating from standstill and approaching the speed of the pusher within a given operating range.

The above and other features of my invention will be described in detail hereinafter with reference to the accompanying drawing in which.

Figure 1:
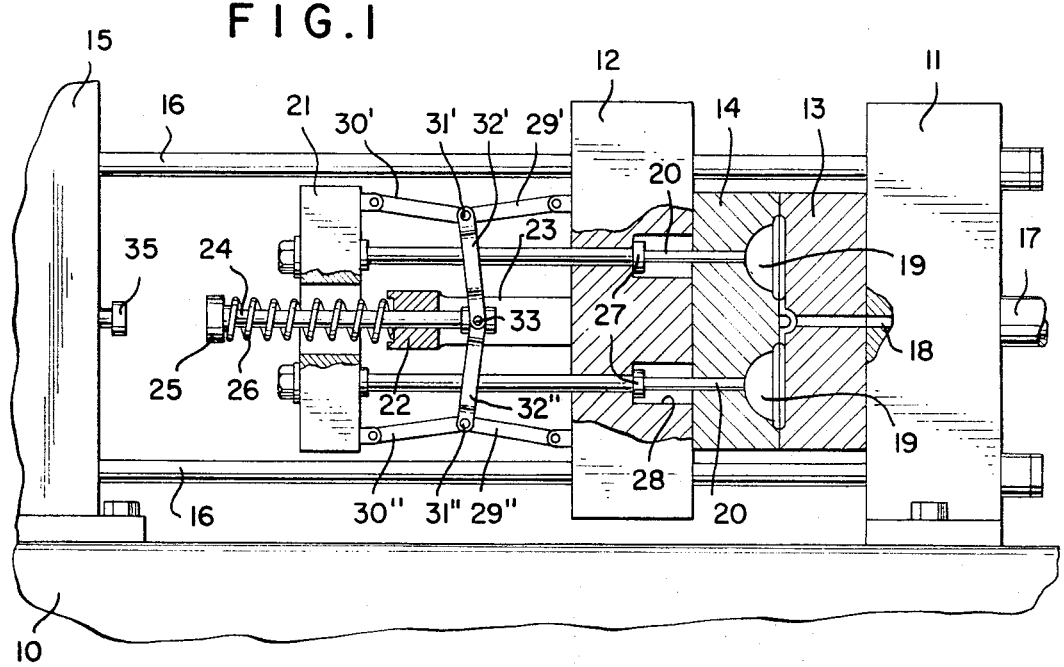
FIG. 1 is a side-elevational view, partly in section, of a portion of an otherwise conventional injection-molding machine incorporating an ejection machanism according to the invention.

In FIG. 1 I have shown at 10 the bed of an injection-molding machine comprising a fixed platen 11 and a movable platen 12 supporting respective mold portions 13 and 14. A portion 15 of the machine frame, rigid with bed 10, carries a set of tie rods 16 whose forward ends are anchored to stationary platen 11 and on which the movable platen 12 is horizontally slidable. At 17 I have shown part of an injection cylinder by which hot plastic material is periodically introduced through a sprue gate 18 into several cavities 19 of mold 13, 14, the molded articles remaining seated in the cavity-forming recesses of the mold portion 14 when the mold is opened by a leftward retraction of platen 12.

Figure 2:
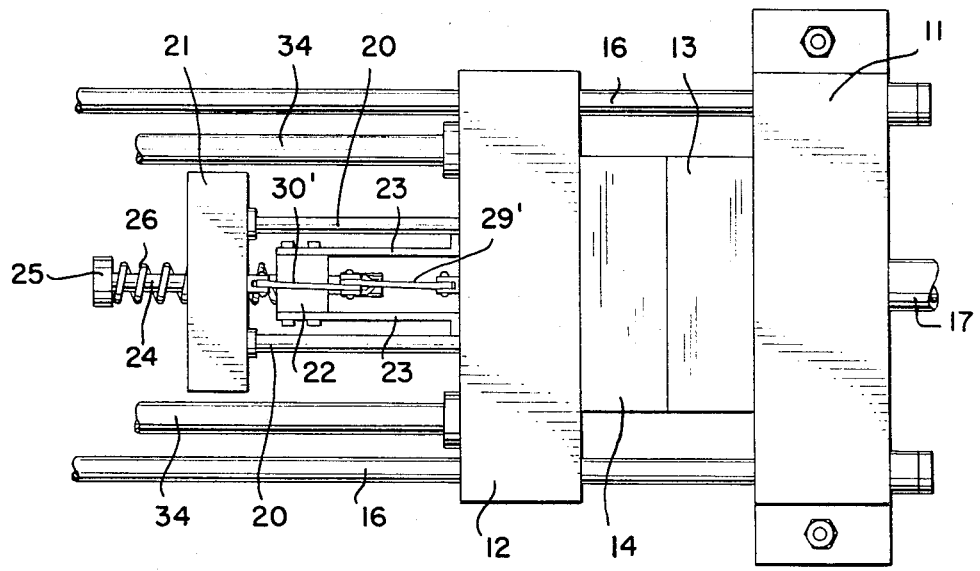
FIG. 2 is a top plan view of the mechanism shown in FIG. 1.

Each cavity 19 is served by an ejector pin 20 whose front end is withdrawn from the cavity when the mold is closed, as in FIG. 1 and 2, and whose rear end is fixedly secured to a supporting plate 21 parallel to platen 12. A rearward extension of this platen, in the form of a guide sleeve 22 supported by legs 23, is traversed by a pusher rod 24 terminating in a head 25 which confronts the frame 15. A spring 26, inserted between sleeve 22 and head 25, urges the rod 24 toward the rear, i.e. in the direction of an adjustable stop 35 on frame 15; pins 20 have collars 27 which, by coming to rest against the ends of respective sockets 28 in platen 12, limit the rearward displacement of rod 24 relative to the platen.

Figure 3:
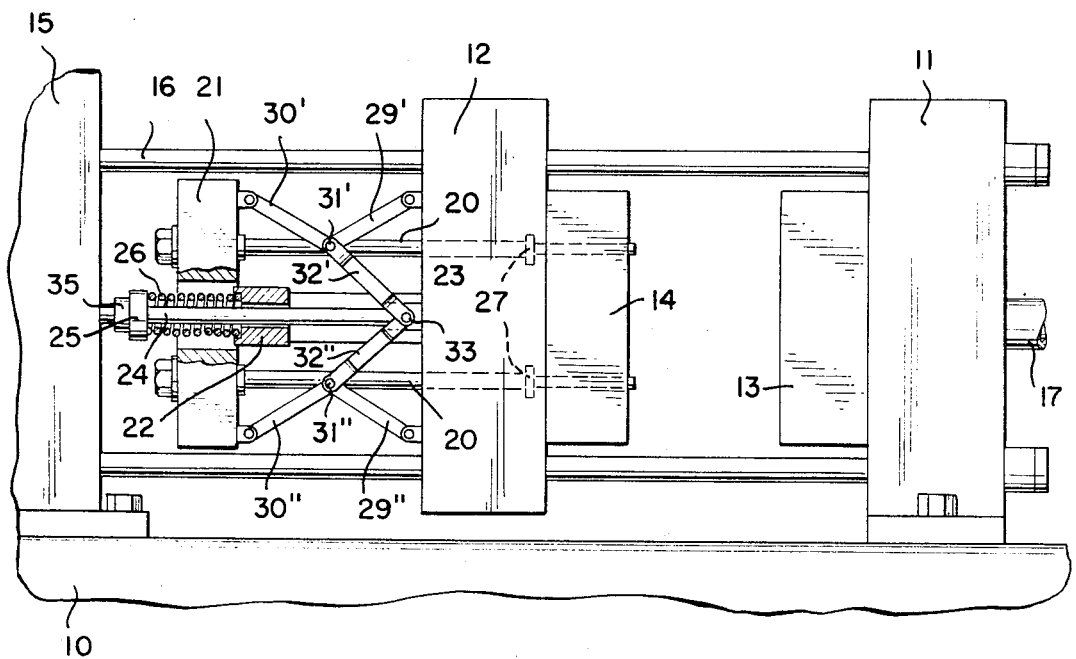
FIG. 3 is a side-elevational view of the same mechanism in an alternate position.

Plate 21 is connected with platen 12 by an articulated linkage which comprises two symmetrical toggle joints 29', 30' and 29'', 30'', arms 29' and 29'' of these joints being pivotally secured to platen 12 above and below rod 24, respectively, whereas their companion arms 30' and 30'' are similarly linked with plate 21. The vertices or knee points 31', 31'' of these joints are articulated to a pair of arms 32', 32'' which are hinged to each other and to the front end of rod 24 at 33 and which form a third toggle joint. The relative lengths of these arms are so chosen that, as shown in FIG. 1, all three toggle joints are almost or exactly in their fully extended positions so that any forward displacement (to the right) of rod 24 relative to platen 12 results in a very slow initial advance of the plate 21 toward the platen; thus, the combined length of arms 32' and 32'' approximately equals the spacing of the outer ends of arms 29', 29'' or 30', 30''. The rate of relative plate motion accelerates as the joints buckle through until, at the end of the range of displacement and as illustrated in FIG. 3, the tips of pins 20 fully penetrate the recesses of mold portion 14 to eject the molded articles therefrom.

The reciprocation of platen 12 is accomplished by a pair of rams 34 which are connected within frame 15 with a conventional drive mechanism synchronized with the piston drive of injection cylinder 17. As the platen 12 is retracted to open the mold, head 25 of rod 24 strikes the abutment 35 to actuate the articulated linkage 29'-32', 29''-32'' with resulting relative displacement of pins 20 at a fraction of the absolute platen velocity.

The adjustability of abutment 35 (and possibly of other parts of the ejector mechanism such as the collars 27 on pins 20) enables the start and the extent of the ejection stroke to be adapted to the shape of the mold cavities. In some instances, the head 25 could be in continuous contact with the stop 35 or some other part of the frame 15 so that the toggle joints will start buckling upon inception of the mold-opening stroke, the differential motion of the pins 20 and the mold portion 14 insuring that the articles to be ejected have sufficient clearance from mold portion 13 before being dislodged from their seats.

It will be evident that the articulated linkage located in a vertical midplane of the movable platen 12, according to the illustrated embodiment, could also be disposed in a horizontal plane and that, if desired, several such linkages in parallel or intersecting planes could be used simultaneously. In a machine with a central ram for the reciprocating of platen 12, for example, ejector pins on opposite sides of the ram axis could be operated by separate harmonic drives each of the type herein disclosed.

I claim:

1. In a molding machine comprising a split mold including a movable platen reciprocable on a bed between an open-mold and a closed-mold position, piston means for reciprocating said movable platen, injection means for introducing a hardenable mass into the closed mold to form at least one article therein, said movable platen being provided with a seat for said article, and ejector means effective upon the opening of said mold to dislodge said article from said seat, the improvement wherein said ejector means comprises an articulated linkage on said platen independent of said piston means and provided with a pair of positively interconnected junctions movable at different rates relative to said platen, pusher means coupled with the faster-moving junction, stop means on said bed spaced from said pusher means in said open-mold position but engageable with said pusher means for advancing same with reference to said platen upon movement of the latter toward said open-mold position, and thrust means on said linkage extending from the slower-moving junction toward said seat.

2. The improvement defined in claim 1, further comprising spring means biasing said pusher means in the direction of said stop means.

3. The improvement defined in claim 1 wherein said linkage includes a pair of symmetrical toggle joints with engaged ends pivoted to said platen and with free ends interconnected by a cross-link generally parallel to said platen, said thrust means being secured to said cross-link, said toggle joints having knee points connected to said pusher means.

4. The improvement defined in claim 3 wherein said pusher means comprises an elongate member having a rear extremity confronting said stop means and having a front extremity connected with said knee points.

5. The improvement defined in claim 4 wherein said movable platen is provided with a rearward extension slidably supporting said elongate member.

6. The improvement defined in claim 4 wherein said linkage includes a further toggle joint connecting said front extremity with said knee points.

7. The improvement defined in claim 6 wherein the spacing of said engaged ends on said platen substantially equals the spacing of said free ends on said cross-link.

8. The improvement defined in claim 7 wherein said further toggle joint comprises a pair of arms with a combined length substantially equaling said spacing.

* * * * *